No. 853,395. PATENTED MAY 14, 1907.
J. BUCHHEIT.
VEHICLE SHAFT.
APPLICATION FILED DEC. 5, 1906.
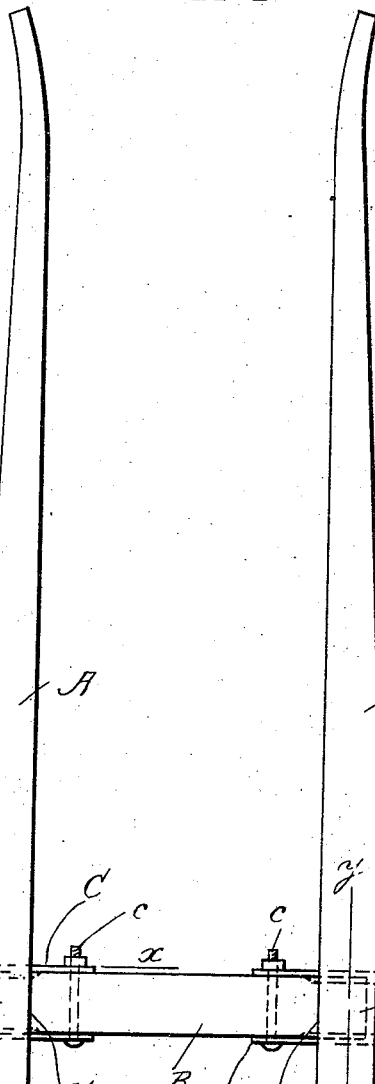
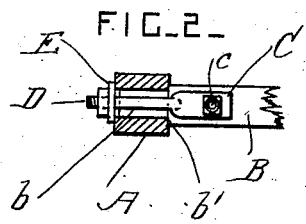
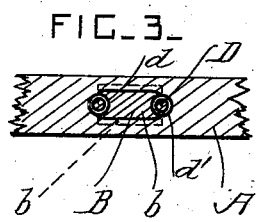
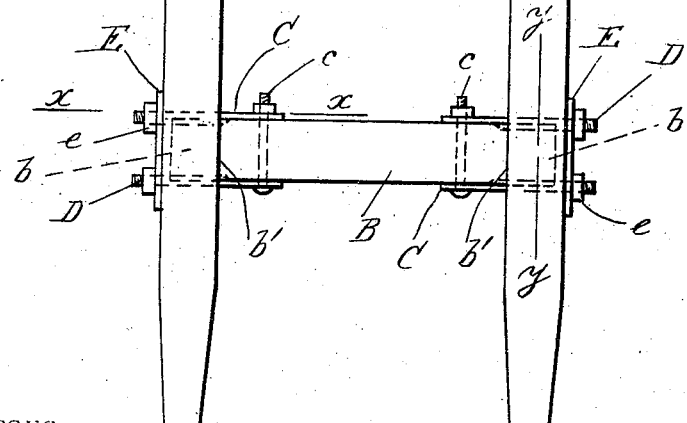

UNITED STATES PATENT OFFICE.

JOHN BUCHHEIT, OF FAIR GROVE, MISSOURI.

VEHICLE-SHAFT.

No. 853,395.　　Specification of Letters Patent.　　Patented May 14, 1907.

Application filed December 5, 1906. Serial No. 346,514.

*To all whom it may concern:*

Be it known that I, JOHN BUCHHEIT, a citizen of the United States, residing at Fair Grove, in the county of Greene and State of Missouri, have invented certain new and useful Improvements in Vehicle-Shafts; and I do hereby declare the following to be a full, clear, and exact description of the invention, such as will enable others skilled in the art to which it appertains to make and use the same.

This invention relates to shafts for vehicles; and it consists in the novel construction and combination of the parts hereinafter fully described and claimed.

In the drawings, Figure 1 is a plan view of a pair of shafts constructed according to this invention. Fig. 2 is a cross-section through one of the shafts, taken on the line $x$—$x$ in Fig. 1. Fig. 3 is a section on the line $y$—$y$ in Fig. 1.

A A are the two shafts, and B is the crossbar between the rear portions of the shafts. The crossbar is provided with projections $b$ and shoulders $b'$ at its end portions, and these projections are let into holes or sockets in the shafts.

C are strap plates which are secured to the sides of the crossbar by bolts $c$. The strap plates have screwthreaded bolts D at their ends which project through grooves $d$ and $d'$ in the end portions of the crossbar and in the shafts respectively.

E are plates on the projecting end portions of the bolts D, and $e$ are nuts screwed on the said bolts and bearing against the said plates. When the nuts are screwed up the shoulders on the crossbar are drawn against the shafts, and the shafts and their crossbar are securely fastened together, so that the crossbar cannot work loose.

What I claim is:

1. The combination, with a vehicle shaft, and a crossbar, one of the said parts having a hole and grooves at the ends of the hole, and the other said part having a projection which engages with the said hole and having also grooves in the side portions of the said projection, of strap-bolts secured to the said parts and arranged in the said grooves and preventing the said projection from sliding out of the said hole.

2. The combination, with a pair of shafts provided with holes and grooves at the ends of the said holes, of a crossbar provided with projections which engage with the said holes and having grooves in the side portions of the said projections, strap-bolts secured to the side portions of the said crossbar and provided with screwthreaded end portions which are arranged in the said grooves, and nuts on the projecting end portions of the said bolts.

In testimony whereof I have affixed my signature in the presence of two witnesses.

JOHN BUCHHEIT.

Witnesses:
　W. H. YANDELL,
　J. A. LONG.